United States Patent
McFarland

(10) Patent No.: US 11,516,802 B2
(45) Date of Patent: Nov. 29, 2022

(54) RESOURCE UNIT RESERVATION IN WI-FI NETWORKS

(71) Applicant: Plume Design, Inc., Palo Alto, CA (US)

(72) Inventor: William J. McFarland, Portola Valley, CA (US)

(73) Assignee: Plume Design, Inc., Palo Alto, CA (US)

( * ) Notice: Subject to any disclaimer, the term of this patent is extended or adjusted under 35 U.S.C. 154(b) by 217 days.

(21) Appl. No.: 17/010,998

(22) Filed: Sep. 3, 2020

(65) Prior Publication Data
US 2021/0105773 A1 Apr. 8, 2021

Related U.S. Application Data

(60) Provisional application No. 62/911,471, filed on Oct. 7, 2019.

(51) Int. Cl.
*H04W 84/12* (2009.01)
*H04W 72/04* (2009.01)
*H04J 11/00* (2006.01)
*H04B 7/0413* (2017.01)

(52) U.S. Cl.
CPC ...... *H04W 72/0453* (2013.01); *H04B 7/0413* (2013.01); *H04J 11/00* (2013.01); *H04W 84/12* (2013.01)

(58) Field of Classification Search
CPC ............. H04W 72/04; H04W 72/0446; H04W 72/0453; H04W 28/26; H04J 11/00; H04B 7/0413
See application file for complete search history.

(56) References Cited

U.S. PATENT DOCUMENTS

| | | |
|---|---|---|
| 7,315,533 B2 | 1/2008 | Theobold et al. |
| 7,414,978 B2 | 8/2008 | Lun et al. |
| 7,953,403 B2 | 5/2011 | Nientiedt |
| 8,798,021 B2 | 8/2014 | Mangalvedhe et al. |
| 9,060,279 B2 | 6/2015 | Ganu et al. |
| 9,066,251 B2 | 6/2015 | Madan et al. |
| 9,131,391 B2 | 9/2015 | Madan et al. |
| 9,131,392 B2 | 9/2015 | Madan et al. |
| 9,420,528 B2 | 8/2016 | Madan et al. |
| 9,497,700 B2 | 11/2016 | Madan et al. |

(Continued)

FOREIGN PATENT DOCUMENTS

| | | |
|---|---|---|
| DE | 102005006872 A1 | 2/2005 |
| DE | 102017002145 A1 | 9/2017 |

OTHER PUBLICATIONS

Jun. 26, 2017 International Search Report for International Application No. PCT/US2017/023130.

(Continued)

*Primary Examiner* — Rahel Guarino
(74) *Attorney, Agent, or Firm* — Clements Bernard Baratta; Lawrence A. Baratta, Jr.

(57) ABSTRACT

Systems and methods include communicating to one or more access points configured to form a Wi-Fi network, wherein at least some of the one or more access points utilize Orthogonal Frequency-Division Multiple Access (OFDMA), and determining Resource Unit (RU) reservations at the one or more access points that utilize OFDMA.

20 Claims, 7 Drawing Sheets

(56) References Cited

U.S. PATENT DOCUMENTS

| | | |
|---|---|---|
| 9,510,214 B1 | 11/2016 | Balasubramaniam et al. |
| 9,516,579 B1 | 12/2016 | Diner et al. |
| 10,057,813 B1 | 8/2018 | Likar et al. |
| 10,912,003 B1 * | 2/2021 | Jupudi ................ H04B 7/0452 |
| 2006/0258395 A1 | 11/2006 | Cave et al. |
| 2007/0149172 A1 | 6/2007 | Dickinson |
| 2007/0206537 A1 | 9/2007 | Cam-Winget et al. |
| 2007/0242621 A1 | 10/2007 | Nandagopalan et al. |
| 2009/0016258 A1 | 1/2009 | Zhang et al. |
| 2009/0257380 A1 | 10/2009 | Meier |
| 2009/0279427 A1 | 11/2009 | Ji et al. |
| 2009/0316585 A1 | 12/2009 | Srinivasan |
| 2009/0323632 A1 | 12/2009 | Nix |
| 2010/0029282 A1 | 2/2010 | Stamoulis et al. |
| 2010/0232317 A1 | 9/2010 | Jing et al. |
| 2011/0039554 A1 | 2/2011 | Bims |
| 2011/0119370 A1 | 5/2011 | Huang et al. |
| 2011/0151886 A1 | 6/2011 | Grayson et al. |
| 2012/0002567 A1 | 1/2012 | Sun et al. |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0201857 A1 | 8/2013 | Bhargava et al. |
| 2013/0272285 A1 | 10/2013 | Goldsmith et al. |
| 2014/0092765 A1 | 4/2014 | Agarwal et al. |
| 2014/0126410 A1 | 5/2014 | Agarwal et al. |
| 2014/0321325 A1 | 10/2014 | Jing et al. |
| 2014/0328190 A1 | 11/2014 | Lord et al. |
| 2015/0023183 A1 | 1/2015 | Ilsar et al. |
| 2015/0215832 A1 | 7/2015 | Fitzpatrick |
| 2015/0341797 A1 | 11/2015 | Madan et al. |
| 2016/0080949 A1 | 3/2016 | Chandrasekhar et al. |
| 2016/0277893 A1 * | 9/2016 | Katabi ................ H04W 4/023 |
| 2017/0196010 A1 * | 7/2017 | Matsuo ............... H04W 72/085 |
| 2018/0254955 A1 | 9/2018 | Ranjan et al. |
| 2018/0324607 A1 | 11/2018 | Rengarajan et al. |
| 2019/0137596 A1 * | 5/2019 | Silverman ............ H04B 7/0871 |
| 2019/0274171 A1 * | 9/2019 | Viger ................ H04W 28/0268 |
| 2021/0204324 A1 * | 7/2021 | Viger ................ H04W 74/0833 |

OTHER PUBLICATIONS

Netgear, genie Mobile App., Mar. 2017, 202-11742-01, pp. 1-57.
Plaff et al., RFC 7047, The Open vSwitch Database Management Protocol, Dec. 2013.
Dec. 4, 2020, International Search Report and Written Opinion for International Patent Application No. PCT/US2020/050636.

* cited by examiner

RESOURCE UNIT RESERVATION IN WI-FI NETWORKS

PRIORITY

The present application claims priority to U.S. Provisional Application No. 62/911,471 filed Oct. 7, 2019 titled Resource Unit reservation in Wi-Fi networks.

FIELD OF THE DISCLOSURE

The present disclosure generally relates to wireless networking systems and methods. More particularly, the present disclosure relates to systems and methods for Resource Unit reservation in Wi-Fi networks.

BACKGROUND OF THE DISCLOSURE

Wi-Fi networks (i.e., Wireless Local Area Networks (WLAN) based on the IEEE 802.11 standards) are ubiquitous. In fact, Wi-Fi is the most common technique for user device connectivity, and the applications that use run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly assigned U.S. patent application Ser. No. 16/032,584, filed Jul. 11, 2018, and entitled "Optimization of distributed Wi-Fi networks," the contents of which are incorporated by reference herein.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long-range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

Further, Wi-Fi is continuing to evolve with newer generations of technology, including IEEE 802.11a, 802.11b, 802.11g, 802.11n, 802.11ac, and 802.11ax. Each generation of technology evolves the Wi-Fi Media Access Control (MAC) and Physical (PHY) layers to add more capabilities. In the case of IEEE 802.11ax, Orthogonal Frequency-Division Multiple Access (OFDMA) has been added as a technique aimed at improving the efficiency of Wi-Fi communication when many small packets are being transmitted to or from multiple client devices. OFDMA can operate both in the downlink (one access point communicating simultaneously to multiple clients), or in the uplink (multiple clients communicating simultaneously to a single access point).

BRIEF SUMMARY OF THE DISCLOSURE

The present disclosure relates to systems and methods for Resource Unit reservation in Wi-Fi networks. The present disclosure contemplates operation in a Wi-Fi network utilizing OFDMA technology, e.g., IEEE 802.11ax, with Resource Unit (RU) reservation. Systems and methods include communicating to one or more access points configured to form a Wi-Fi network, wherein at least some of the one or more access points utilize Orthogonal Frequency-Division Multiple Access (OFDMA), and determining Resource Unit (RU) reservations at the one or more access points that utilize OFDMA.

In an embodiment, the RU reservations are in a multi-access point network, such as one in a tree topology. The RU reservations can be performed at one or more leaf nodes as well at one or more repeating nodes. The RU reservations can be based on individual flows in the Wi-Fi network or aggregate flows in the Wi-Fi network. The RU reservations can be performed at all repeating nodes and the leaf node on a path to a client device. The RU reservations can be provided by a controller which can be either local to the Wi-Fi network or in the cloud. The multi-access point network may include access points in multiple homes or businesses (public/hotspot network), in the path of the client device.

The RU reservations can be based on throughput factors used to determine allocation, such as MIMO dimension, Signal strength, Signal to noise ratio, Interference, Observed data rate, and the like. The RU reservations can account for packet loss probability such as based on frequency channel overlap with other hops in the home, or neighbors, observed Packet Error Rate (PER), interference, congestion/traffic load, increased collision probability is factored given multiple homes or businesses, and the like. The RU reservations can be based on demand factors used to determine the allocation, such as historical traffic loads, needs indicated by the client device, needs intuited by access points, queues depths, QoS needs for different flows (DSCP, TOS, DPI, etc.), destination, source, etc. The ingress or egress access points that can observe the packets—the problem of encapsulated packets traversing at midpoints. The repeating access points can perform packet inspection (e.g., looking inside GRE tunnel header) or looking at four address frames. The RU reservations can be communicated to the access points which store the information locally. A controller can utilize and program as a database holding RU information on each access point separately. The access point can locally adjust allocations based on local knowledge, particularly increasing allocations or adding allocations. The RU reservation decision is dynamic and changes with the conditions in the network, such as a time-based calculation, a change of condition-based calculation such as based on load changes, a calculation based on flow start and end, and the like.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Resource Unit reservation in Wi-Fi networks. The present disclosure contemplates operation in a Wi-Fi network utilizing OFDMA technology, e.g., IEEE 802.11ax (also referred to as Wi-Fi 6), with Resource Unit (RU) reservation. Systems and methods include communicating to one or more access points configured to form a Wi-Fi network, wherein at least some of the one or more access points utilize Orthogonal Frequency-Division Multiple Access (OFDMA), and determining Resource Unit (RU) reservations at the one or more access points that utilize OFDMA.

In an embodiment, the RU reservations are in a multi-access point network, such as one in a tree topology. The RU reservations can be performed at one or more leaf nodes as well at one or more repeating nodes. The RU reservations can be based on individual flows in the Wi-Fi network or aggregate flows in the Wi-Fi network. The RU reservations can be performed at all repeating nodes and the leaf node on a path to a client device. The RU reservations can be provided by a controller which can be either local to the Wi-Fi network or in the cloud. The multi-access point network may include access points in multiple homes or businesses (public/hotspot network), in the path of the client device.

The RU reservations can be based on throughput factors used to determine allocation, such as MIMO dimension, Signal strength, Signal to noise ratio, Interference, Observed data rate, and the like. The RU reservations can account for packet loss probability such as based on Frequency channel overlap with other hops in the home, or neighbors, Observed Packet Error Rate (PER), Interference, Congestion/traffic load, Increased collision probability is factored given multiple homes or businesses, and the like. The RU reservations can be based on demand factors used to determine the allocation, such as Historical traffic loads, Needs indicated by the client device, Needs intuited by access points, Queues depths, QoS needs for different flows (DSCP, TOS, DPI, etc.), destination, source, etc. The ingress or egress access points that can observe the packets—the problem of encapsulated packets traversing at midpoints. The repeating access points can perform packet inspection (e.g., looking inside GRE tunnel header) or looking at four address frames. The RU reservations can be communicated to the access points which store the information locally. A controller can utilize and program as a database holding RU information on each access point separately. The access point can locally adjust allocations based on local knowledge, particularly increasing allocations or adding allocations. The RU reservation decision is dynamic and changes with the conditions in the network, such as a time-based calculation, a change of condition-based calculation such as based on load changes, a calculation based on flow start and end, and the like.

Wi-Fi System

Figure 1:
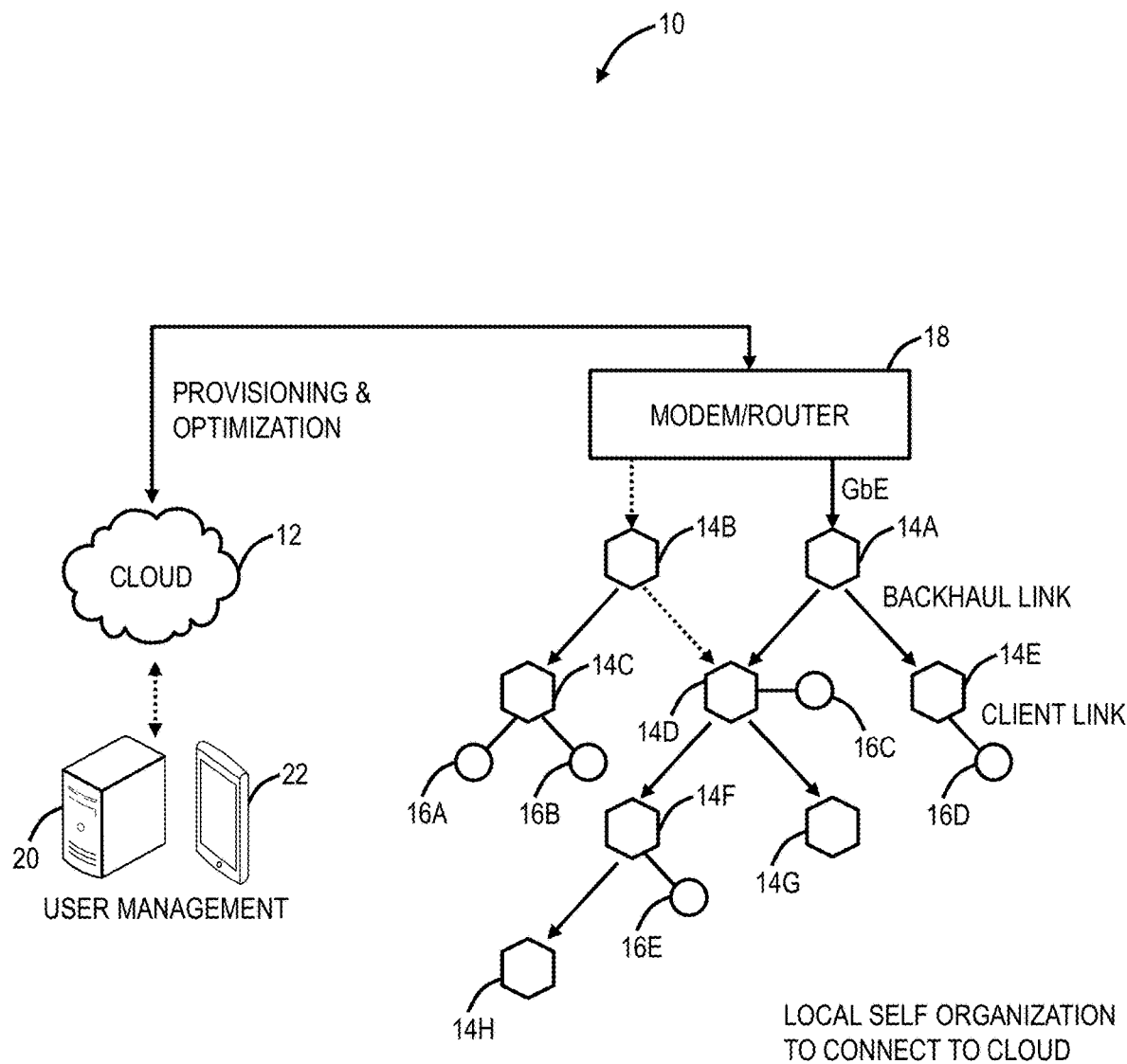
FIG. 1 is a network diagram of a Wi-Fi system with cloud-based control.

FIG. 1 is a network diagram of a Wi-Fi system 10 with cloud-based 12 control. The Wi-Fi system 10 can operate in accordance with the IEEE 802.11 protocols and variations thereof. The Wi-Fi system 10 includes a plurality of access points 14 (labeled as access points 14A-14H) which can be distributed throughout a location, such as a residence, office, or the like. That is, the Wi-Fi system 10 contemplates operation in any physical location where it is inefficient or impractical to service with a single access point, repeaters, or a mesh system. As described herein, the Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the Wi-Fi system 10 can include between 2 to 12 access points or more in a home. A large number of access points 14 (which can also be referred to as nodes in the Wi-Fi system 10) ensures that the distance between any access point 14 is always small, as is the distance to any Wi-Fi client device 16 needing Wi-Fi service. That is, an objective of the Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the Wi-Fi system 10 is short and goes through a few walls. This results in very strong signal strengths for each hop in the Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, Internet of Things (IoT) devices, or any network-enabled device. For external network connectivity, one or more of the access points 14 can be connected to a modem/router 18 which can be a cable modem, Digital Subscriber Loop (DSL) modem, or any device providing external network connectivity to the physical location associated with the Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely, such as through an application ("app") running on a user device 22. The running of the Wi-Fi system 10, therefore, becomes what is commonly known as a "cloud service." The servers 20 can be a cloud-based controller configured to receive measurement data, to analyze the measurement data, and to configure the access points 14 in the Wi-Fi system 10 based thereon, through the cloud 12. The servers 20 can also be configured to determine which access point 14 each of the Wi-Fi client devices 16 connect (associate) with. That is, in an example aspect, the Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation that relies on a local configuration, such as by logging in locally to an access point. In the Wi-Fi system 10, the control and optimization does not require local login to the access point 14, but rather the user device 22 (or a local Wi-Fi client device 16) communicating with the servers 20 in the cloud 12, such as via a disparate network (a different network than the Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the Wi-Fi system 10, only a small subset of the access points 14 require direct connectivity to the modem/router 18 with the non-connected access points 14 communicating with the modem/router 18 through the backhaul links back to the connected access points 14.

Wi-Fi System Compared to Conventional Wi-Fi Systems

Figure 2:
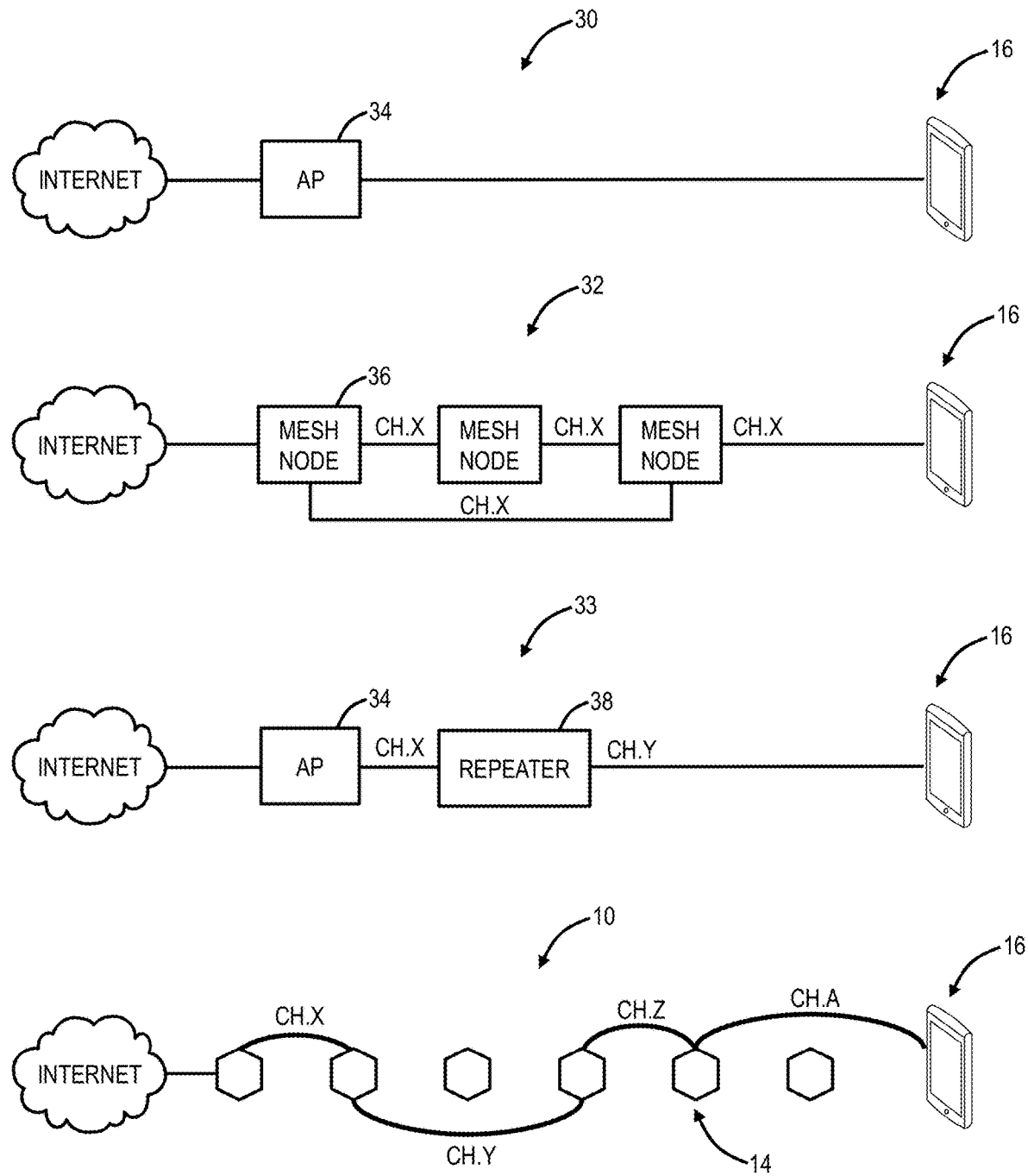
FIG. 2 is a network diagram of differences in the operation of the Wi-Fi system of FIG. 1 relative to a conventional single access point system, a Wi-Fi mesh network, and a Wi-Fi repeater system.

FIG. 2 is a network diagram of differences in the operation of the Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the Wi-Fi system 10 can use different channels/bands between access points 14 and between the Wi-Fi client device 16 (e.g., Ch. X, Y, Z, A), and, also, the Wi-Fi system 10 does not necessarily use every access point 14, based on configuration and optimization by the cloud 12. The Wi-Fi system 10 solves the problems of the single access point system 30 by providing multiple access points 14. The Wi-Fi system 10 is not constrained to a star topology as in the Wi-Fi repeater network 33 which at most allows two wireless hops between the Wi-Fi client device 16 and a gateway. Also, the Wi-Fi system 10 forms a tree topology where there is one path between the Wi-Fi client device 16 and the gateway, but which allows for multiple wireless hops, unlike the Wi-Fi repeater network 33.

Wi-Fi is a shared, simplex protocol meaning only one conversation between two devices can occur in the network at any given time, and if one device is talking, the others need to be listening. By using different Wi-Fi channels, multiple simultaneous conversations can happen simultaneously in the Wi-Fi system 10. By selecting different Wi-Fi channels between the access points 14, interference and congestion are avoided. The server 20 through the cloud 12 automatically configures the access points 14 in an optimized channel hop solution. The Wi-Fi system 10 can choose routes and channels to support the ever-changing needs of consumers and their Wi-Fi client devices 16. The Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an embodiment, the servers 20 in the cloud 12 are configured to optimize channel selection for the best user experience.

Of note, the systems and methods described herein contemplate operation through any of the Wi-Fi system 10, the single access point system 30, the Wi-Fi mesh network 32, and the Wi-Fi repeater network 33. There are certain aspects of the systems and methods which require multiple device Wi-Fi networks, such as the Wi-Fi system 10, the Wi-Fi mesh network 32, and the Wi-Fi repeater network.

Access Point

Figure 3:
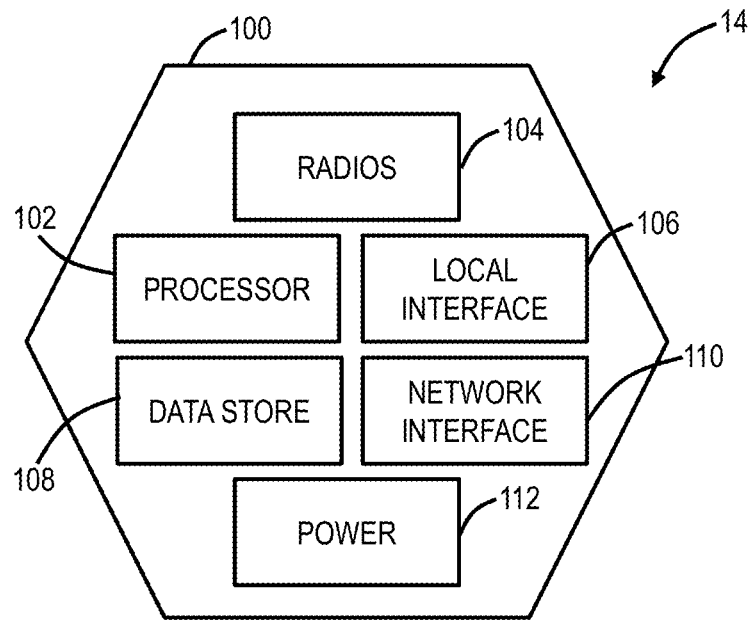
FIG. 3 is a block diagram of functional components of the access point in the Wi-Fi system of FIG. 1 or the other Wi-Fi networks in FIG. 2.

FIG. 3 is a block diagram of functional components of the access point 14 in the Wi-Fi system 10, the single access point system 30, the Wi-Fi mesh network 32, and the Wi-Fi repeater network 33. The access point 14 includes a physical form factor 100 which contains a processor 102, a plurality of radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chipset), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile optimized processor such as optimized for power consumption and mobile applications.

The radios 104 enable wireless communication in the Wi-Fi system 10. The radios 104 can operate according to the IEEE 802.11 standard. The radios 104 include address, control, and/or data connections to enable appropriate communications on the Wi-Fi system 10. As described herein, the access point 14 includes a plurality of radios to support different links, i.e., backhaul links and client links. The radios 104 can also include Wi-Fi chipsets configured to perform IEEE 802.11 operations. In an embodiment, an optimization can determine the configuration of the radios 104, such as bandwidth, channels, topology, etc. In an embodiment, the access points 14 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106, allowing connectivity to the user device 22 (or a Wi-Fi client device 16) for onboarding to the Wi-Fi system 10, such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device that does not support Wi-Fi. In an embodiment, all of the access points 14 in the Wi-Fi system 10 include the network interface 110. In another embodiment, select access points 14, which connect to the modem/router 18 or require local wired connections, have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
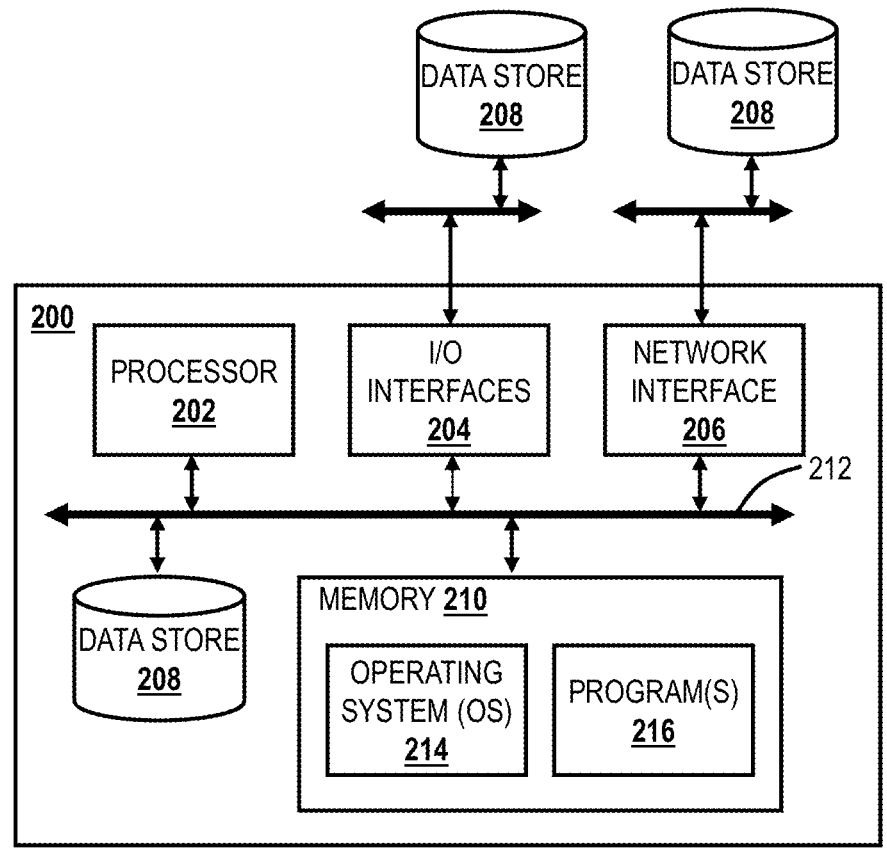
FIG. 4 is a block diagram of functional components of a server, a Wi-Fi client device, or a user device that may be used with the Wi-Fi system of FIG. 1 or the other Wi-Fi networks in FIG. 2.

FIG. 4 is a block diagram of functional components of the server 20, the Wi-Fi client device 16, or the user device 22, which may be used with the Wi-Fi system 10. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chipset), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

Configuration and Optimization Process for the Distributed Wi-Fi System

Figure 5:
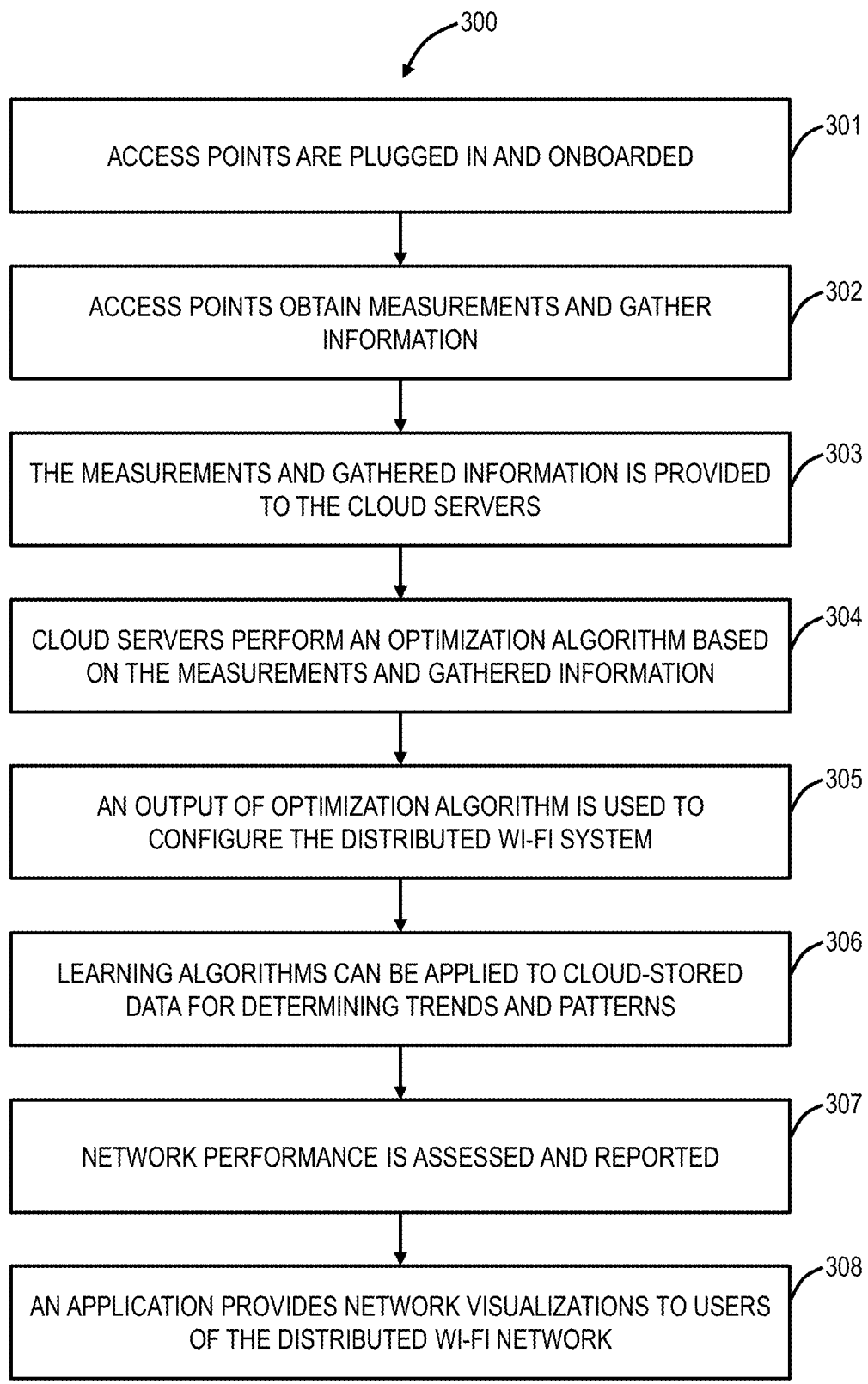
FIG. 5 is a flowchart of a configuration and optimization process for the Wi-Fi system of FIG. 1.

FIG. 5 is a flowchart of a configuration and optimization process 300 for the Wi-Fi system 10. Specifically, the configuration and optimization process 300 includes various steps 301-308 to enable efficient operation of the Wi-Fi system 10. These steps 301-308 may be performed in a different order, in a subset where not all steps are performed and may be repeated on an ongoing basis, allowing the Wi-Fi system 10 to adapt to changing conditions. First, each of the access points 14 is plugged in and onboarded (step 301). In the Wi-Fi system 100, only a subset of the access points 14 are wired to the modem/router 18 (or optionally with a wireless connection to the modem/router 18), and those access points 14 without wired connectivity have to be onboarded to connect to the cloud 12. The onboarding step 301 ensures a newly installed access point 14 connects to the Wi-Fi system 10 so that the access point 14 can receive commands and provide data to the servers 20. The onboarding step 301 can include configuring the access point with the correct Service Set Identifier (SSID) (network ID) and associated security keys. In an embodiment, the onboarding step 301 is performed with Bluetooth or equivalent connectivity between the access point 14 and a user device 22, allowing a user to provide the SSID, security keys, etc. Once onboarded, the access point 14 can initiate communication over the Wi-Fi system 10 to the servers 20 for configuration.

Second, the access points 14 obtain measurements and gather information to enable optimization of the networking settings (step 302). The information gathered can include signal strengths and supportable data rates between all nodes as well as between all nodes and all Wi-Fi client devices 16. Specifically, the measurement step 302 is performed by each access point 14 to gather data. Various additional measurements can be performed, such as measuring an amount of interference, loads (throughputs) required by different applications operating over the distributed Wi-Fi system 10, etc. Third, the measurements and gathered information from the measurement step 302 is provided to the servers 20 in the cloud 12 (step 303). The steps 301-303 are performed on location at the Wi-Fi system 10. Of note, the QoE measurements described herein are contemplated in these steps.

These measurements in steps 302, 303 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud-controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore, their interference cannot be moved to another channel or otherwise changed. The system must adapt to them, rather than changing them. These out-of-network interferers include Wi-Fi networks that are not cloud-controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time-stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the Wi-Fi system 10 (step 304). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function, which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the Wi-Fi system 10 (step 305). The nodes and client devices need to be configured from the cloud based on the output of the optimization. Specific techniques are used to make the configuration fast, and to minimize the disruption to a network that is already operating. The outputs of the optimization are the operational parameters for the Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the Wi-Fi system 10. The optimization tries to use the lowest possible channel bandwidth for each link that will support the load required by the various user's applications. By using the narrowest sufficient throughput channels, the maximum number of non-interfering channels are left over for other links within the Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the Wi-Fi system 10, meaning which nodes connect to which other nodes. The actual route through the Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 306). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 307). Eighth, an application (such as a mobile app operating on the user device 22) can provide user visibility into the network operation (step 308). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular-based connection can be used to signal status, notify the service provider and other users, and can even be used to carry data from the home to the internet during the time that the user's normal internet connection is malfunctioning.

The configuration and optimization process 300 is described herein with reference to the Wi-Fi system 10 as an example embodiment. Those skilled in the art will recognize the configuration and optimization process 300 can operate with any type of multiple node Wi-Fi system, including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization.

OFDMA

The focus of the present disclosure is part of step 305, specifically regarding the techniques to configure and control client devices 16 in the distributed Wi-Fi network 10. This may also apply to the Wi-Fi mesh network 32 and the Wi-Fi repeater network 33, i.e., any multiple access point systems.

Figure 6:
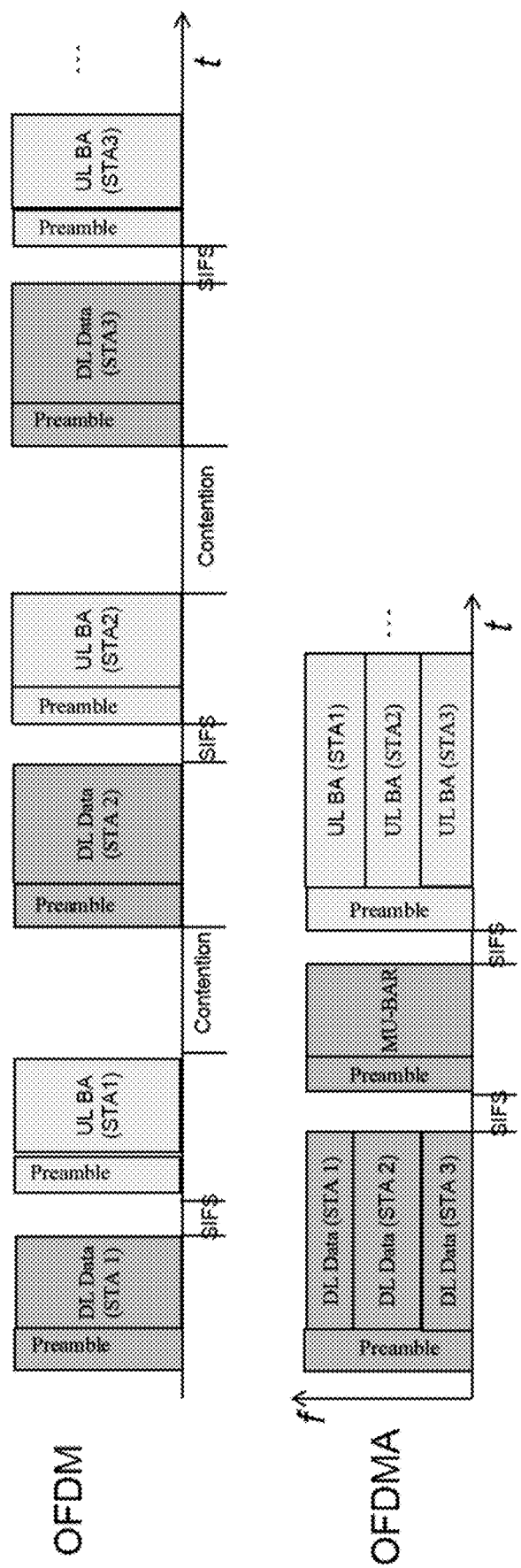
FIG. 6 is graphs of frequency versus time to compare downlink OFDMA is compared to tradition single user communication, namely Orthogonal Frequency-Division Multiplexing (OFDM)

FIG. 6 is graphs of frequency versus time to compare downlink OFDMA is compared to tradition single user communication, namely Orthogonal Frequency-Division Multiplexing (OFDM). In this example, short packets are being delivered to three different client devices. In the single-user case, the transmissions are independent, with their attendant time overhead associated with each transmission. In the OFDMA case, the three transmissions are placed together into a single transmission. As can be seen, by the time scale, the complete exchange to communicate with the three client devices takes less total time when using OFDMA, which represents an improvement in efficiency, and the preservation of more capacity in the network for other traffic. Uplink OFDMA works similarly the OFDMA in FIG. 6, only the Uplink (UL) and Downlink (DL) periods are reversed, and in the OFDMA case the UL period has transmissions originating from multiple client devices at the same time.

In the single access point system 30, all client devices 16 connect to the access point 34. The access point's 34 job is to decide how to send downlink traffic to the client devices 16, and how they should send uplink traffic to the access point 34 in turn. This is sometimes called "grouping," as the access point 34 must decide which client devices 16 it will transmit to within a single OFDMA transmission. Grouping requires selecting the client devices 16 that will work together will in an OFDMA exchange. Factors that need to be considered include:

Whether the devices can receive and/or transmit OFDMA packets;

The relative signal strength from the access point to the client devices 16, and from the client devices 16 to the access point;

The length of the packets that the client devices 16 need in the downlink and uplink direction; and The amount of traffic that each client device 16 requires.

Once the access point has decided which client devices 16 will be included together in the OFDMA transmission, it must allocate the frequencies and time within the OFDMA waveform.

Figure 7:
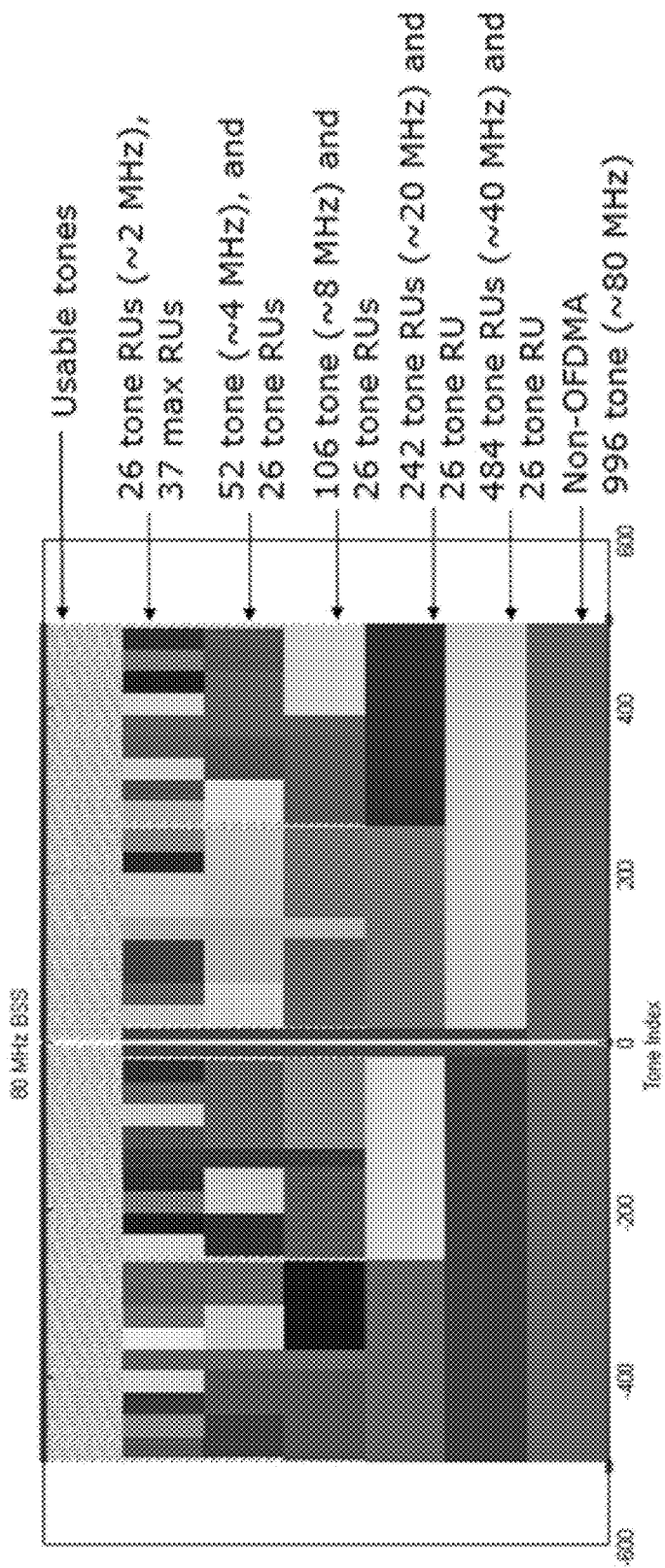
FIG. 7 is a graph of the variety of time/frequency assignments an access point can make in transmitting with the client devices.

FIG. 7 is a graph of the variety of time/frequency assignments an access point can make in transmitting with the client devices 16. Each group of carriers, indicated in the diagram with different shading, could be allocated to any of the clients within the OFDMA group. The frequency slots and time slices can be referred to as Resource Units (RUs). A Resource Unit (RU) is a unit in OFDMA terminology used in IEEE 802.11ax to denote a group of subcarriers (tones) used in both DL and UL transmissions. With OFDMA, different transmit powers may be applied to different RUs. There are a maximum of 9 RUs for 20 MHz, 18 in case of 40 MHz, and more in case of 80 or 160 MHz. The RUs enables an access point to allow multi-users to access it simultaneously and efficiently.

RU Reservation

While resource units were added primarily to support OFDMA operation, they can be used to improve the Quality of Service (QoS) in wireless networks. The allocation of RUs to a particular traffic flow, or to a particular device in the network can serve to reserve airtime, across some set of the frequency range for that traffic or device. This reservation protects that traffic from being squeezed out by other traffic, no matter how much other traffic trying to pass through the access point. If the reservation is equal to the needs of the sensitive data stream, perhaps with some added margin, then a very reliable communication link for that data stream will be made. Even large increases in other traffic will not interfere with the transfer of that stream.

The reservation process can be used even if there is just one access point in the network communicating to a single client, e.g., in the single access point system 30. For example, consider a client device 16 that is receiving a video stream, and is also receiving a software update from the Internet. It is important to the user that the video stream keeps going uninterrupted even if the data is downloaded for the software update becomes very large. In this situation, the user would not mind if the software update takes longer, while the video stream keeps running. To ensure this, some combination of frequency and time slices might be reserved for the video stream, the software update being limited to the remaining frequencies and time slices. Thus, the present disclosure contemplates operation with any of the Wi-Fi systems described in FIG. 2.

The reservation process becomes more complicated when the home has multiple access points, such as with the Wi-Fi system 10, the Wi-Fi mesh network 32, and the Wi-Fi repeater network 33. Using multiple access points have advantages as described above, but it requires an innovative approach to make effective use of Resource Unit reservations.

Figure 8:
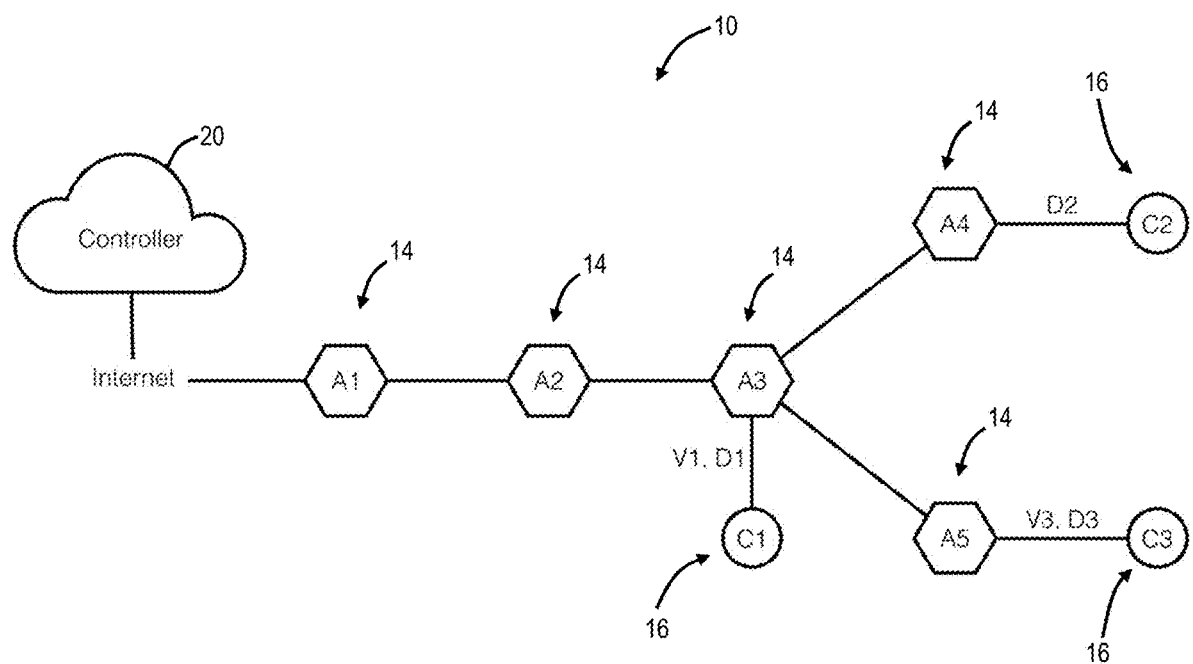
FIG. 8 is a network diagram of an example distributed Wi-Fi system with five example access points (labeled A1 to A5) and three example client devices (labeled C1 to C3).

FIG. 8 is a network diagram of an example distributed Wi-Fi system 10 with five example access points 14 (labeled A1 to A5) and three example client devices 16 (labeled C1 to C3). A controller (server 20) can receive information from and configure the Wi-Fi system 10 over the Internet, as described herein. The lines in FIG. 8 indicate the wireless connections between the devices. A1 is the Ingress access point 14A as traffic from the Internet enters at A1, i.e., connected to the modem/router 18. A1, A2, and A3 are intermediate access points since they are passing traffic on to other access points 14. A3, A4, and A5 are egress access points because they deliver content to the client devices 16. A4 and A5 can be referred to as leaf access points since they do not pass traffic on to other access points 14. For the purposes of explanation, assume two of the clients devices C1, C3 are receiving a video stream (V1 and V3), which are critical to keep flowing, and all clients C1, C2, C3 are receiving a data stream (D1 to D3) such as the download of a software update or the like, which can take a flexible length of time, so can have its delivery slowed if necessary.

As an example, consider several possible RU reservation schemes for the access point A5. In the following RU tables, each row represents a different period of time. This period of time might be sequential separate packets or time periods during a single packet depending on the specific wireless system's RU capabilities. The columns represent different frequency sub-channels. Open cells represent RUs that are available for any use, for example carrying low priority data traffic, or carrying additional video traffic if the reservations prove insufficient to move the high priority stream. In the diagram below, it is assumed that video stream V3 can be carried utilizing a net capacity of two RUs in each time period.

| | | | Frequency | | | |
|---|---|---|---|---|---|---|
| Time | F1 | F2 | F3 | F4 | F5 | ... |
| T1 | V3 | V3 | | | | |
| T2 | V3 | V3 | | | | |
| T3 | V3 | V3 | | | | |

Any pattern that preserves an average of two RUs in each time slice for the video traffic will work. There can be advantages to other schemes. Wireless links can have particular frequencies that work poorly due to interference or multi-path. In the diagram below, the frequency sub-channels used are rotated. This provides frequency diversity, causing only occasional losses of information due to a frequency-specific problem, rather than a substantial consistent loss of information.

| | | | Frequency | | | |
|---|---|---|---|---|---|---|
| Time | F1 | F2 | F3 | F4 | F5 | ... |
| T1 | V3 | | | V3 | | |
| T2 | | V3 | | | V3 | |
| T3 | | | V3 | | | V3 |

It would also be possible for the controller 20 to allocate RUs to the video stream in an unequal way in each time period. This creates a jitter in the arrival of the video packets, but as long as this jitter is significantly less than the time length of the buffer at the client device 16, no degradation in the video signal would be observed:

| | | | Frequency | | | |
|---|---|---|---|---|---|---|
| Time | F1 | F2 | F3 | F4 | F5 | ... |
| T1 | V3 | V3 | V3 | | | |
| T2 | | | | | | |
| T3 | V3 | V3 | V3 | | | |

The controller 20 could also reserve RUs for the background data, although in this case, it would have little benefit since the QoS requirement for the data traffic is low. Note that there might still be unused RUs that could be taken by additional data or video traffic as needed.

|      | Frequency |    |    |    |    |    |
|------|-----------|----|----|----|----|----|
| Time | F1 | F2 | F3 | F4 | F5 | ... |
| T1   | V3 | V3 |    |    | D3 | D3 | D3 |
| T2   | V3 | V3 |    |    | D3 | D3 | D3 |
| T3   | V3 | V3 |    |    | D3 | D3 | D3 |

The appropriate resource reservation at access point A3 must account for all of the traffic that needs to be transmitted by the radio in A3. This includes the traffic to client C1, and the traffic to access points A4 and A5. The number of RUs required for a given stream will not necessarily be equivalent at all access points 14. At A5, as described above, V3 required 2 RUs to have sufficient capacity to communicate with client C3. However, client C3 may have been very far from A5, such that the data rate going to C3 is low. On the link from A3 to A5, the data rate might be much higher, and the traffic could be carried in a single RU. In this example, C1 might be connected at a low data rate, such that an appropriate reservation for the data transmitted from A3 would look like:

|      | Frequency |    |    |    |    |     |
|------|----|----|----|----|----|-----|
| Time | F1 | F2 | F3 | F4 | F5 | ... |
| T1   | V3 |    | V1 | V1 |    |     |
| T2   | V3 |    | V1 | V1 |    |     |
| T3   | V3 |    | V1 | V1 |    |     |

The example given for A3 assumes that A3 is able to separate the video traffic from other traffic. This is not always the case. The video and data may be encrypted, making it difficult to identify what is what. The video and data also could be aggregated together or encapsulated in such a way that the video and data cannot be separated. In that case, the controller 20 may choose to allocate sufficient RUs for the entire set of traffic flowing to A5:

|      | Frequency |    |    |    |    |     |
|------|---------|---------|---------|----|----|-----|
| Time | F1 | F2 | F3 | F4 | F5 | ... |
| T1   | V3 + D3 | V3 + D3 | V3 + D3 | V1 | V1 |     |
| T2   | V3 + D3 | V3 + D3 | V3 + D3 | V1 | V1 |     |
| T3   | V3 + D3 | V3 + D3 | V3 + D3 | V1 | V1 |     |

The traffic reservations at A1 and A2 would follow the examples just given for A3. The video streams V1 and V3 need to be protected, but depending on circumstances, the controller 20 might have to protect the entire flows of all traffic going to each of the access points 14 that have a video client. Therefore, A1 and A2 may need to make reservations for a single traffic flow consisting of V3+D3 (all traffic bound for A5) and V1+D1 (all traffic bound for A1). Note that the RU reservations at A1 and A2, even though the traffic streams are identical, might be different. That could be caused by the data transmission rate from A1 to A2 being different from the data transmission rate from A2 to A3, requiring a different number of RUs to transmit the same amount of data.

Ideally, the controller 20 would make RU reservations at all the access points 14 in the ways just described. This would include making reservations at multiple leaf nodes (A3, A4, A5), and any intervening repeating nodes (A1, A2, A3). At each node the controller 20 would need to calculate how many resources should be reserved for each portion of the traffic, considering the conditions of the links it is transmitting on, and the properties of the traffic.

As mentioned earlier, the controller 20 might be local to the home or might be located in the cloud. An advantage to the controller 20 being located in the cloud is that it could assign RUs across APs that are not all in the same home. For example, the set of access points 14 shown in the examples above (A1 to A5) might not all be in the same home. They could be any mix of in people's homes, in businesses or shops, or public on the streets. A multi-hop network might be formed from these access points 14 in different environments, and it would be beneficial to manage them jointly from the cloud. Even if the access points 14 in the different homes are not meshed together, it could be beneficial to control them centrally, where the interference and congestion levels at all the access points 14 can be understood centrally, and reservations made appropriately.

The key to using RUs effectively is for the controller 20 to know accurately how many RUs are required to transmit the required data streams. Assigning too many RUs to a stream will be wasteful, leaving some of the RUs unused, and reducing the throughput available to the rest of the network. Assigning too few RUs leaves part of the high priority (e.g., video) stream unprotected, competing with other traffic, and potentially being delayed or lost altogether.

To enable accurate estimates of the RUs to be reserved, the controller 20 requires three groups of information:
- the factors affecting the throughput that can be achieved,
- the factors affecting packet loss probability, and
- the factors determining the required demand.

The achievable throughput for each link can be calculated or measured directly. When calculating throughputs, the following parameters are helpful:
- The MIMO dimension that can be utilized on the particular link. This can be limited by the MIMO capability of the transmitter, the MIMO capability of the receiver, or by the conditions in the wireless channel (commonly indicated by the channel rank or condition number).
- The signal strength over the link. This is determined by the transmit power available and the path loss or attenuation over the distance of the link.
- The Signal to Noise Ratio (SNR) at the receiver. This is determined by the signal strength of the desired signal arriving at the receiver, the thermal noise floor of the receiver, and any noise present at the receiver from other sources.
- The amount of time the airwaves are occupied by interference. Many wireless systems, Wi-Fi included, use a listen before talk type protocol. Such devices will hold off from transmitting while the channel appears to be busy. The channel can be busy from non-Wi-Fi noise, such as Bluetooth or other radio system transmissions, Wi-Fi transmissions from a different network, such as your neighbor's network, or self-interference from transmissions in your own network, such as transmission at other hops along the path from the original data source to the final data destination. It also can be caused by transmission to different clients in the network, the different clients potentially connected to different APs within the network.

A more accurate estimate of the throughput that can be achieved on a given link can sometimes be obtained by looking at the actual achieved PHY data rates and/or throughputs achieved on that particular link. However, these measurements may not always be available or up to date if traffic has not been flowing recently. Therefore, the ability to calculate the expected throughput, as well as predict it from previously measured actual transmissions, is highly desired.

An additional factor in the throughput that needs to be considered is the Packet Error Rate (PER). Packets can be lost due to noise, interference, congestion, insufficient SNR, or poor channel conditions. Each time a packet is lost due to error, the packet must be re-transmitted, consuming more airtime, and more RUs. Therefore, it is beneficial for the controller 20 to properly estimate and factor the PER as it is reserving RUs. Factors that are important for estimating the PER are:

- Whether there are other hops in the network on the same frequency channel. Such hops will result in transmissions by multiple access points 14 on the same channel. While the listen before talk is relatively effective in preventing collisions, it is still possible for both access points 14 to begin transmitting at the same time, which generally will result in the failure of the packets being transmitted by both access points 14. In Wi-Fi networks, this collision rate can vary from close to zero to more than 50% in networks with many access points 14 on the same channel.
- The traffic load/congestion at the other access points 14 in the network, or in access points 14 in neighboring networks on the same channel.
- Interference from other radio systems, for example, interference into Wi-Fi networks from Bluetooth radios. Generally, transmissions for different radio systems are less effective at avoiding collisions, so this problem can be substantial.

As with throughput, the PER can also be determined by looking at the historical PER that has actually occurred in the recent past. Considering the factors just listed, it is clear that a centralized controller can do a better job predicting the PER and, therefore, the need for resource reservations. The PER, in particular, is very dependent on what is happening in the rest of the network, or rest of a complete apartment complex. Having all that information available at a single controller can improve the predictions.

To determine the required RU reservations, along with the throughput and packet error rates, the controller 20 needs to estimate the traffic demands or load that needs to be carried at a high priority. Because traffic flows that deserve protection can start and stop quickly and can vary greatly in their required throughput, a range of methods are required to estimate the required resource reservations.

The most direct technique is to analyze historical traffic loads. A centralized controller can learn the usage patterns of a particular client, say a Roku media player, and can automatically assume that level of usage each time a flow begins to the player. A more accurate way is to have the client device (in this example the Roku player) provide to the controller 20 (or to the AP 14, which subsequently can inform the controller 20) the required throughput to the device. Unfortunately, few devices at this time provide such information.

Along with considering the destination of the traffic, the source of the traffic can provide an indication of the required throughput. In this example, a stream that starts up coming from an Internet video service provider (e.g., Netflix) could be assumed to require resource reservations, and the typical data rate of these streams can be known or learned through historical observations.

In some cases, the data flows themselves have indications clarifying if they require a high level of QoS and are therefore deserving of RU reservations. Arriving IP packets (layer 3 networking) may contain a Differentiated Services Code Point (DSCP) or Type of Service (TOS) indication. These indicate the type of packet or the desired QoS for that packet. These can be used to decide if the particular traffic flow should get RU reservations. Similarly, at layer 2 in the networking stacks, the frames may have IEEE 802.1p/q headers containing traffic priority information. For example, the 802.1Q C-TAG PCP header indicates traffic priorities.

Unfortunately, many flows do not come with the proper marking in the headers. In these cases, it may be necessary to do Deep Packet Inspection (DPI) to see what is inside of the packet. If the packets are seen to contain video or audio, then they deserve special protection to enhance their QoS. DPI can help repeating access points 14 separate the various traffic flows bound for a single endpoint into those requiring RU reservations and those that do not.

In some cases, the traffic flows are most identifiable at the point the traffic first enters the system (ingress). This ingress could be from the Internet in the case of a downlink flow, or could be at the access point 14 to which the client is connected in the case of uplink traffic (e.g., a security camera streaming video out to the cloud). The identification at ingress can be determined by the source address, the destination address, by packet headers, or by DPI on the body of the packet itself.

Repeating access points 14 can use some of the same techniques. For example, they can observe the source and destination addresses by looking at the four address frames typically used in Wi-Fi systems for multi-hop packet forwarding. They also can utilize DPI, as described above.

It is possible for the system to observe and adjust the RU reservations. A key metric would be the queue depth at each access point 14 for the different traffic flows. A flow that builds up a large queue waiting to transmit has insufficient RUs reserved for it. At the other extreme, a flow that never has a single packet queued probably has been allocated too many RUs. Therefore, the queue depth should be transmitted to the controller 20 for analysis and adjustment.

Throughout this process, the access points 14 involved need to move the various parameters and observations described to the controller 20 in order for it to analyze the situation and make decisions on the RU allocation. A variety of communication protocols are appropriate for moving such observations. In the preferred embodiment, the Message Queuing Telemetry Transport (MQTT) protocol is used. This protocol is designed specifically for short, frequent reporting from sensing devices that fit this application well.

Once the controller 20 has made a determination of the appropriate RU reservations, it needs to communicate those to each access point 14 in the network. The communication should include an indication of which packet flow is to be associated with which RU reservation. This can be indicated by the source, destination, IP port number, or another unique identifier that is present in the data flow. The access points 14 would store these RU reservation instructions locally, allowing them to be updated whenever the controller 20 adjusts its allocation. A variety of communication protocols are appropriate for providing control information from a controller 20 to a set of APs 14. In the preferred embodiment, the Open vSwitch Database (OVSDB) protocol is used. This is based on a database, which uses callbacks to synchronize the state of the databased in each of the APs 14 with the database for each access point 14 in the cloud.

While the central controller 20 has many advantages in determining the RU reservations, there are some advantages to having them adjusted locally by the access point 14. For example, reaction to changing conditions can be faster if done locally. Therefore, the preferred embodiment allows the allocations to be adjusted locally by each access point 14. These adjustments should be communicated back to the cloud so that the controller 20 knows the current situation. The synchronization function of OVSDB provides this reverse communication capability.

Many of the conditions described that need to be considered in properly allocating RUs are dynamic. It is assumed that the allocations must change over time. Several triggers can be used to cause a reassessment of the RU allocation. One is simple elapsed time. For example, the controller 20 could recalculate all allocations based on current conditions each minute. The recalculation could also be triggered by a change in conditions. Thresholds of change can be set, which if crossed, indicate a significant enough change in conditions to warrant a recalculation of the RU assignments. The most important change in conditions is the starting and stopping of flows. Effective management of RUs would naturally involve re-calculating allocations each time a flow requiring QoS starts or stops.

Following any recalculation of RU reservations, the controller 20 would inform the access points 14 of the new allocation, using communication methods as described previously. And, once the new reservations are in place, the access points 14 would provide the new conditions and observations back to the access points 14 using the reporting methods described previously.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi controller comprising:
 a processor and memory storing instructions that, when executed, cause the processor to
  communicate to one or more access points configured to form a Wi-Fi network, wherein at least some of the one or more access points utilize Orthogonal Frequency-Division Multiple Access (OFDMA), and
  determine Resource Unit (RU) reservations at the one or more access points that utilize OFDMA, wherein RU reservations are determined dynamically and change based on at least one of a time based recalculation, a recalculation based on a change of condition of the Wi-Fi network, and a recalculation based on data flows starting and ending.

2. The Wi-Fi controller of claim 1, wherein the Wi-Fi controller is one of a local controller and a cloud based controller.

3. The Wi-Fi controller of claim 1, wherein the processor determines RU reservations for at least one of multiple leaf nodes of the one or more access points that utilize OFDMA, repeating nodes of the one or more access points that utilize OFDMA based on at least one of individual data flows and aggregated data flows, and at all repeating nodes and a leaf node of the one or more access points that utilize OFDMA on a path to a client for which the RU reservations are made.

4. The Wi-Fi controller of claim 1, wherein the one or more access points include access points that are positioned at multiple locations including at least one of multiple homes and multiple businesses that are within a path of packets for a client.

5. The Wi-Fi controller of claim 1, wherein the RU reservations are determined using throughput factors including Multiple-Input, and Multiple-Output (MIMO) dimension, signal strength, signal to noise ratio, interference, and observed data rate of the one or more access points.

6. The Wi-Fi controller of claim 1, wherein the RU reservation accounts for packet loss probability based on at least one of frequency channel overlap with other hops in a Wi-Fi system, observed Packet Error Rate (PER), interference, congestion and traffic load, increased collision probability do to a topography of the Wi-Fi network.

7. The Wi-Fi controller of claim 1, wherein the processor performs at least one of cause information of the RU reservations to be provided to the one or more access points to be stored locally, and program an OVSDB holding the information of the RU reservations on each of the one or more access points separately.

8. A Wi-Fi controller comprising:
a processor and memory storing instructions that, when executed, cause the processor to
communicate to one or more access points configured to form a Wi-Fi network, wherein at least some of the one or more access points utilize Orthogonal Frequency-Division Multiple Access (OFDMA), and
determine Resource Unit (RU) reservations at the one or more access points that utilize OFDMA, wherein the RU reservations are determined for at least one of multiple leaf nodes of the one or more access points that utilize OFDMA, repeating nodes of the one or more access points that utilize OFDMA based on at least one of individual data flows and aggregated data flows, and at all repeating nodes and a leaf node of the one or more access points that utilize OFDMA on a path to a client for which the RU reservations are made.

9. The Wi-Fi controller of claim 8, wherein the Wi-Fi controller is one of a local controller and a cloud based controller.

10. The Wi-Fi controller of claim 8, wherein the one or more access points include access points that are positioned at multiple locations including at least one of multiple homes and multiple businesses that are within a path of packets for a client.

11. The Wi-Fi controller of claim 8, wherein the RU reservations are determined using throughput factors including Multiple-Input, and Multiple-Output (MIMO) dimension, signal strength, signal to noise ratio, interference, and observed data rate of the one or more access points.

12. The Wi-Fi controller of claim 8, wherein the RU reservation accounts for packet loss probability based on at least one of frequency channel overlap with other hops in a Wi-Fi system, observed Packet Error Rate (PER), interference, congestion and traffic load, increased collision probability do to a topography of the Wi-Fi network.

13. The Wi-Fi controller of claim 8, wherein the RU reservations are determined based on demand factors of the Wi-Fi network including at least one of historical traffic loads, needs indicated by a client device, needs intuited by the one or more access points, queues depths, Quality of Service (QoS) needs for different data flows based on one or more of Differentiated Services Code Point (DSCP), Type of Service (ToS) and Deep Packet Inspection (DPI), data destination, and data source.

14. The Wi-Fi controller of claim 8, wherein needs intuited by the one or more access points include at least one of needs of ingress and egress access points that observe packets and to mitigate encapsulated packets traversing at midpoints, needs of repeating access points for performing packet inspection, and needs of repeating access points for looking at four address frames.

15. A Wi-Fi controller comprising:
a processor and memory storing instructions that, when executed, cause the processor to
communicate to one or more access points configured to form a Wi-Fi network, wherein at least some of the one or more access points utilize Orthogonal Frequency-Division Multiple Access (OFDMA),
determine Resource Unit (RU) reservations at the one or more access points that utilize OFDMA, and
perform at least one of cause information of the RU reservations to be provided to the one or more access points to be stored locally, and program an OVSDB holding the information of the RU reservations on each of the one or more access points separately.

16. The Wi-Fi controller of claim 15, wherein the Wi-Fi controller is one of a local controller and a cloud based controller.

17. The Wi-Fi controller of claim 15, wherein the processor determines RU reservations for at least one of multiple leaf nodes of the one or more access points that utilize OFDMA, repeating nodes of the one or more access points that utilize OFDMA based on at least one of individual data flows and aggregated data flows, and at all repeating nodes and a leaf node of the one or more access points that utilize OFDMA on a path to a client for which the RU reservations are made.

18. The Wi-Fi controller of claim 15, wherein the one or more access points include access points that are positioned at multiple locations including at least one of multiple homes and multiple businesses that are within a path of packets for a client.

19. The Wi-Fi controller of claim 15, wherein the RU reservations are determined using throughput factors including Multiple-Input, and Multiple-Output (MIMO) dimension, signal strength, signal to noise ratio, interference, and observed data rate of the one or more access points.

20. The Wi-Fi controller of claim 15, wherein the RU reservation accounts for packet loss probability based on at least one of frequency channel overlap with other hops in a Wi-Fi system, observed Packet Error Rate (PER), interference, congestion and traffic load, increased collision probability do to a topography of the Wi-Fi network.

\* \* \* \* \*